United States Patent
Hu et al.

(10) Patent No.: US 12,486,543 B2
(45) Date of Patent: Dec. 2, 2025

(54) MOLECULAR MARKERS FOR GERMPLASM IDENTIFICATION AND SELECTION OF CAROTENOID-RICH BAY SCALLOPS

(71) Applicant: OCEAN UNIVERSITY OF CHINA, Shandong (CN)

(72) Inventors: Xiaoli Hu, Qingdao (CN); Shiqi Liu, Qingdao (CN); Huizhen Wang, Qingdao (CN); Yihan Zhang, Qingdao (CN); Jingyao Yuan, Qingdao (CN); Zhenmin Bao, Qingdao (CN)

(73) Assignee: OCEAN UNIVERSITY OF CHINA

( * ) Notice: Subject to any disclaimer, the term of this patent is extended or adjusted under 35 U.S.C. 154(b) by 0 days.

(21) Appl. No.: 18/912,947

(22) Filed: Oct. 11, 2024

(65) Prior Publication Data
US 2025/0179590 A1   Jun. 5, 2025

(30) Foreign Application Priority Data
Dec. 1, 2023   (CN) .......................... 202311630228.4

(51) Int. Cl.
*C12Q 1/68*   (2018.01)
*C12Q 1/686*   (2018.01)
*C12Q 1/6888*   (2018.01)

(52) U.S. Cl.
CPC .......... *C12Q 1/6888* (2013.01); *C12Q 1/686* (2013.01); *C12Q 2600/124* (2013.01)

(58) Field of Classification Search
None
See application file for complete search history.

(56) References Cited

U.S. PATENT DOCUMENTS 7,537,897 B2 *   5/2009   Brenner ............... C12Q 1/6816
                                                          435/6.14

FOREIGN PATENT DOCUMENTS

| CN | 101828532 A | 9/2010 |
|----|-------------|--------|
| CN | 102634514 A | 8/2012 |
| CN | 103740702 A | 4/2014 |
| CN | 104273073 A | 1/2015 |

(Continued)

OTHER PUBLICATIONS

Lin, Lu et al., Genomic analysis of the genetic diversity and signatures of selection in a bay scallop southern subspecies *Argopecten irradians concentricus*, Journal of Fishery Sciences of China, 30(6): 669-676, 2023.

(Continued)

*Primary Examiner* — Aaron A Priest
(74) *Attorney, Agent, or Firm* — PORUS IP LLC (57) ABSTRACT

Embodiments of the present disclosure provide molecular markers for germplasm identification and selection of carotenoid-rich bay scallops. The molecular markers include SNP1, SNP2, SNP3 and SNP4. Embodiments of the present disclosure also provide a group of primers as shown in SEQ ID NO. 5, SEQ ID NO. 6 and SEQ ID NO. 7, SEQ ID NO. 8 for the molecular markers. The disclosure provides a rapid, simple, and batch method for the identification and screening of carotenoid-rich bay scallops at a seedling stage and an adult scallop stage, which can effectively reduce the cultivation cost of carotenoid-rich scallops, improve the efficiency of farming and breeding, and has a broad market application prospect.

2 Claims, 3 Drawing Sheets

Specification includes a Sequence Listing.

(56) References Cited

FOREIGN PATENT DOCUMENTS

CN 109837279 A 6/2019
KR 102586202 B1 10/2023

OTHER PUBLICATIONS

Du, Xuedi et al., Draft genome and SNPs associated with carotenoid accumulation in adductor muscles of bay scallop (*Argopecten irradians*), Journal of Genomics, 5: 83-90, 2017.
The Second Office Action in Chinese Application No. 202311630228.4 mailed on Feb. 7, 2024, 8 pages.
Notification to Grant Patent Right for Invention in Chinese Application No. 202311630228.4 mailed on Feb. 28, 2024, 4 pages.

\* cited by examiner

MOLECULAR MARKERS FOR GERMPLASM IDENTIFICATION AND SELECTION OF CAROTENOID-RICH BAY SCALLOPS

CROSS-REFERENCE TO RELATED APPLICATIONS

This application claims priority to Chinese patent application No. 202311630228.4, filed Dec. 1, 2023, the entire contents of each of which are hereby incorporated by reference.

SEQUENCE LISTING

The instant application contains a Sequence Listing which has been submitted electronically in XML format and is hereby incorporated by reference in its entirety. The XML copy, created on Aug. 9, 2024, is named "2024 Sep. 10-Sequence list-65501-H002US00," and is 8,863 bytes in size.

TECHNICAL FIELD

The present disclosure relates to a field of molecular genetic breeding of marine organisms, and in particular, relates to a molecular marker for germplasm identification and selection of carotenoid-rich bay scallops.

BACKGROUND

Carotenoid is a class of biologically active natural fat-soluble pigments that is widely found in plants and animals as well as microorganisms. They have a wide range of health benefits for humans, such as acting as antioxidants, preventing vitamin A deficiency, enhancing immune responses, and so on. Humans are incapable of de novo synthesis of carotenoids and rely on dietary intake from food. As a vital source of food for humans, aquatic animals (e.g., fish, shrimp, shellfish, and crabs) can accumulate the types of carotenoids (e.g., astaxanthin, pectenolone, etc) that terrestrial organisms do not possess. The content and pigmentation of these carotenoids are closely associated with the quality and flavor of the aquatic animals and have become important indicators for assessing the nutritional value of many aquatic animal species such as salmon. Therefore, cultivation of high-quality aquatic animals enriched with carotenoids has significant economic value and social benefits, and has become an important direction for aquatic breeding.

Bay scallops (*Argopecten irradians*) are economically important farmed shellfish in China. In aquaculture populations of bay scallop, a rare color variant was found that is present in a small proportion. The adductor muscle of this variant was orange due to enrichment in carotenoids, rather than the usual white. It has been found that a trait of carotenoid enrichment in the adductor muscle of the bay scallop is heritable, and therefore high-quality carotenoid-rich bay scallops may be genetically selected through genetic breeding. The development of molecular markers for this trait may provide an effective genetic screening tool for the selection of carotenoid-rich bay scallops. In addition, carotenoid coloration trait is easy to observe at a harvest stage, but difficult to discriminate at a seedling stage due to a low enrichment of carotenoids in their adductor muscle. Therefore, it is necessary to develop molecular markers for germplasm identification and selection of carotenoid-rich bay scallops, which can conveniently and quickly identify seeds of the carotenoid-rich bay scallops, promote its large-scale aquaculture promotion and boost the bay scallop aquaculture quality and efficiency.

SUMMARY

One or more embodiments of the present disclosure provide a molecular marker for carotenoid-rich bay scallops. The molecular markers comprise: an SNP3 site at position 172 of SEQ ID NO. 3, and the base of the SNP3 site is C or A.

One or more embodiments of the present disclosure provide a group of molecular markers for carotenoid-rich bay scallops. The group of molecular markers comprises: an SNP3 site at position 172 of SEQ ID NO. 3, and the base of the SNP3 site is C or A; an SNP1 site at position 26 of SEQ ID NO. 1, and the base of the SNP1 site is T or G; an SNP2 site at position 27 of SEQ ID NO. 2, and the base of the SNP2 site is G or T; an SNP4 site at position 45 of SEQ ID NO. 4, and the base of the SNP4 site is T or C.

Embodiments of the present disclosure also provide a method for screening carotenoid-rich bay scallops based on molecular markers. The method comprises the following steps:

(1) Sampling bay scallops to be tested;
(2) Extracting DNA from the bay scallops to be tested as a template, using nucleotide sequences shown in SEQ ID NOs. 5~6 and 7~8 as primers, to separately perform PCR amplification on the sample DNA, obtaining PCR amplification products, sequencing the PCR amplification products to determine a genotype of SNP1, SNP2, SNP3 and SNP4 site in each bay scallop to be tested;
(3) When the genotyping result exhibits that a genotype of one of the bay scallops to be tested containing the SNP1 site is of a GG type, a genotype of the bay scallop to be tested containing the SNP2 site is of a TT type, a genotype of the bay scallop to be tested containing the SNP3 site is of an AA type, or a genotype of the bay scallop to be tested containing the SNP4 site is of a CC type, determining the bay scallop to be tested as a carotenoid-rich bay scallop.

The SNP1 site is located at position 26 of a nucleotide sequence shown in SEQ ID NO. 1, and the base of the SNP1 site is T or G;

The SNP2 site is located at position 27 of the nucleotide sequence shown in SEQ ID NO. 2, and the base of the SNP2 site is G or T;

The SNP3 site is located at position 172 of the nucleotide sequence shown in SEQ ID NO. 3, and the base of the SNP3 site is C or A;

The SNP4 site is located at position 45 of a nucleotide sequence shown in SEQ ID NO. 4, and the base of the SNP4 site is T or C.

In some embodiments, in step (1), different sampling strategies are adopted at different time periods, and the sampling strategies include: in a small-size seedling stage, randomly selecting 50~100 bay scallops from a bay scallop population and performing whole tissue sampling on the selected bay scallops for identification of the seeds of the bay scallop population; in a large-size seedling stage, taking 3~5 gill filaments of each bay scallop and performing non-destructive sampling on the gill filaments for the directed selection of the seeds of the bay scallop population; in an adult scallop stage, taking 3~5 gill filaments of each bay scallop and performing non-destructive sampling on the gill filaments for the selection of parents.

BRIEF DESCRIPTION OF THE DRAWINGS

The present disclosure will be further explained through exemplary embodiments. These exemplary embodiments are described in detail with reference to the drawings. These embodiments are not limiting, and in these embodiments, same numbering denotes same structure.

DETAILED DESCRIPTION

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios based on these drawings without creative labor. Unless obviously obtained from the context or the context illustrates otherwise, the same numeral in the drawings refers to the same structure or operation.

As shown in the present disclosure and in the claims, unless the context clearly suggests an exception, the words "one," "a", "an" and/or "the" do not refer specifically to the singular, but may also include the plural. Generally, the terms "including" and "comprising" suggest only the inclusion of clearly identified steps and elements that do not constitute an exclusive list, and the method or apparatus may also include other steps or elements.

Cultivation of carotenoid-rich bay scallops has significant economic value and social benefits. Although the trait of carotenoid-rich bay scallops may be observed at a harvest stage, it is difficult to screen carotenoid-rich bay scallops by observation at a seedling stage due to their low carotenoid content. Accordingly, high-quality carotenoid-rich bay scallops may be selected by genetic breeding, e.g. developing molecular markers related to this trait.

A molecular marker is a genetic marker based on inter-individual nucleotide variation. The molecular marker may include, but are not limited to, Single Nucleotide Polymorphism (SNP). SNP is a genetic marker that results from single nucleotide variations in the genome.

Embodiments of the present disclosure provide a molecular marker for germplasm identification and selection of carotenoid-rich bay scallops. The molecular marker includes an SNP3 site at position 172 of SEQ ID NO. 3, and the base of the SNP3 site is C or A.

As used herein, the SNP3 site is located at base 34979425 on chromosome Chr03 of bay scallops, named as Arg03g34979425. As used herein, the SNP3 site is located at position 172 of the nucleotide sequence shown in SEQ ID NO. 3, and the base of the SNP3 site is C or A.

Embodiments of the present disclosure provide a group of molecular markers for germplasm identification and selection of carotenoid-rich bay scallops. The group of molecular markers includes: an SNP3 site at position 172 of SEQ ID NO. 3, and the base of the SNP3 site is C or A; an SNP1 site at position 26 of SEQ ID NO. 1, and the base of the SNP1 site is T or G; an SNP2 site at position 27 of SEQ ID NO. 2, and the base of the SNP2 site is G or T; an SNP4 site at position 45 of SEQ ID NO. 4, and the base of the SNP1 site is T or C.

As used herein, the SNP1 site is located at base 34979279 on chromosome Chr03 of bay scallops, named as Arg03g34979279. As used herein, the SNP1 site is located at position 26 of the nucleotide sequence shown in SEQ ID NO. 1, and the base of the SNP1 site is either T or G.

As used herein, the SNP2 site is located at base 34979280 on chromosome Chr03 of bay scallops, named as Arg03g34979280. As used herein, the SNP2 site is located at position 27 of the nucleotide sequence shown in SEQ ID NO. 2, and the base of the SNP2 site is G or T.

As used herein, the SNP4 site is located at base 35046482 on chromosome Chr03 of bay scallops, named as Arg03g35046482. As used herein, the SNP4 site is located at position 45 of the nucleotide sequence shown in SEQ ID NO. 4, and the base of the SNP4 site is T or C.

At the SNP1 site, when a genotype of a bay scallop is of a GG type, the bay scallop is a carotenoid-rich bay scallop, and when the genotype of the bay scallop is of a TT type, the bay scallop is a normal bay scallop.

At the SNP2 site, when a genotype of a bay scallop is of a TT type, the bay scallop is a carotenoid-rich bay scallop, and when the genotype of the bay scallop is of a GG type, the bay scallop is a normal bay scallop.

At the SNP3 site, when a genotype of a bay scallop is of an AA type, the bay scallop is a carotenoid-rich bay scallop, and when the genotype of the bay scallop is of a CC type, the bay scallop is a normal bay scallop.

At the SNP4 site, when a genotype of the bay scallop is of a CC type, the bay scallop is a carotenoid-rich bay scallop, and when the genotype of the bay scallop is of a TT type, the bay scallop is a normal bay scallop.

Embodiments of the present disclosure also provide a method for screening carotenoid-rich bay scallops based on the above molecular markers. The method includes the following steps.

(1) Sampling bay scallops to be tested.

In some embodiments, in step (1), different sampling strategies are adopted at different time periods, and the sampling strategies include: in a small-size seedling stage, randomly selecting 50~100 bay scallops from a bay scallop population and performing whole tissue sampling on the selected bay scallops for the identification of the seeds of the bay scallop population; in a large-size seedling stage, taking 3~5 gill filaments of each bay scallop and performing non-destructive sampling on the gill filaments for the directed selection of the seeds of the bay scallop population; and in an adult scallop stage, taking 3~5 gill filaments of each bay scallop and performing non-destructive sampling on the gill filaments for the selection of parents.

In some embodiments, the small-size seedling stage may be a stage when the shell height of the bay scallop is about 0.5 cm. In some embodiments, the large-size seedling stage may be a stage when the shell height of the bay scallop is in a range of 3 to 5 cm.

(2) Extracting sample DNA from the bay scallops to be tested as a template, using the nucleotide sequences shown in SEQ ID NOs. 5~6 and 7~8 as primers to separately perform PCR amplification on the sample DNA, obtaining the PCR amplification products, and sequencing the PCR amplification products to determine a genotype of SNP1, SNP2, SNP3 and SNP4 site in each bay scallop to be tested.

In some embodiments, the primers in step (2) include two pairs of primers for amplifying SNP1, SNP2, SNP3, and SNP4. Sequences of the primers include: a primer pair for detecting SNP1, SNP2, and SNP3, with an upstream primer sequence shown in SEQ ID NO. 5, and a downstream primer sequence shown in SEQ ID NO. 6; a primer pair for detecting SNP4, with an upstream primer sequence shown in SEQ ID NO. 7 and a downstream primer sequence shown in SEQ ID NO. 8.

(3) When the genotyping result exhibits that a genotype of one of the bay scallops to be tested containing the SNP1 site is of a GG type, a genotype of the bay scallop to be tested containing the SNP2 site is of a TT type, a genotype of the bay scallop to be tested containing the SNP3 site is of an AA type, or a genotype of the bay scallop to be tested containing the SNP4 site is of a CC type, determining the bay scallop to be tested as a carotenoid-rich bay scallop.

Some embodiments of the present disclosure also provide an application of the group of molecular markers for germplasm identification and selection of carotenoid-rich bay scallops in the selection of carotenoid-rich bay scallops.

The SNP molecular markers provided according to some embodiments of the present disclosure are significantly correlated with a carotenoid-enriched trait of adductor-muscles of bay scallops, and can accurately and efficiently identify the carotenoid-enriched trait of adductormuscles of bay scallops. The SNP molecular markers can be used to accurately identify and screen carotenoid-rich varieties of bay scallops in a seedling stage, and can also realize the selection of parental bay scallops containing pure type in an adult scallop stage.

Some embodiments of the present disclosure provide SNP molecular markers for carotenoid-rich bay scallops and group thereof, corresponding primers and group thereof. By detecting the SNP molecular markers, it is possible to quickly, easily, and batchily identify and screen pure carotenoid-rich bay scallops in the seedling stage and parental stage, effectively reduce a cost of bay scallop culture and improve an efficiency of culture and breeding, which has a broad market application prospect.

The following embodiments of the present disclosure are described in detail, and examples of the embodiments are shown in the accompanying drawings. The following embodiments are a further description of the present disclosure and are not a limitation of the present disclosure.

EXAMPLES

Figure 1:
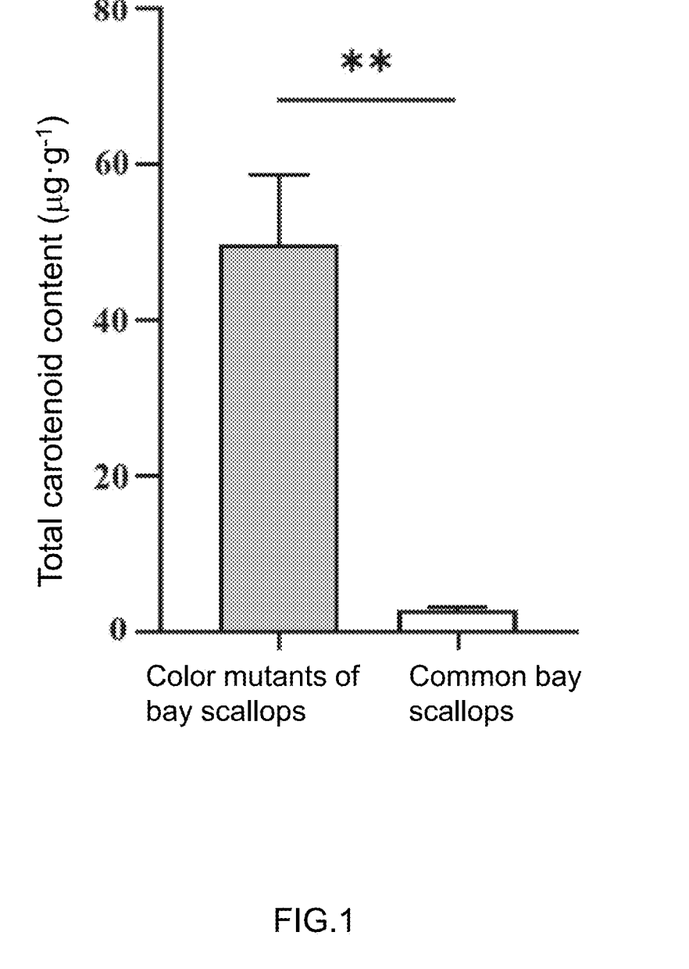
FIG. 1 is a bar graph comparing total carotenoid content of normal bay scallops with white adductor muscle and bay scallops with orange adductor muscle according to an embodiment of the present disclosure.

Example 1: A Method for Extracting SNP Markers Associated with Carotenoid Coloration in Bay Scallops The SNP markers associated with carotenoid colorationin bay scallops were identified by whole genome resequencing, includes the following steps:

(1) Selecting 10-month-old bay scallops from a scallop farm in Huangdao, Qingdao, Shandong. The selected 10-month-old bay scallops include 20 normal bay scallops with white adductor muscles and 19 bay scallops with orange adductor muscles. The carotenoid content of the bay scallops with orange adductor muscles is significantly higher than that of the normal bay scallops with white adductor muscles by detecting (as shown in FIG. 1). Adductor muscle tissues from 39 bay scallops were sampled, frozen in liquid nitrogen, and stored at −80° C. for later use.

(2) The whole genomic DNA of adductor muscle tissues of each bay scallop taken in step (1) was extracted using phenol-chloroform extraction, and the whole genomic DNA samples were subsequently used for DNA library construction and whole genome resequencing.

(3) Quality control of raw data for each sample was performed using Trimmomatic-0.39 software to obtain high quality clean data.

(4) Clean reads from each sample were aligned to the genome reference of the bay scallops using the MEM algorithm of BWA software to obtain the same file. And then use Samtools tool and Picard software to sort the same file and to eliminate and correct duplicate sequences to obtain a bam format file.

(5) Using a HaplotypeCaller command of a GATK software, polymorphic sites of the bam file are typed to generate the vcf file; the SNP sites in the vcf file are quality-controlled using a VariantFiltration command of the GATK software and a Vcftools software, in order to obtain high-quality SNP sites that meet quality control conditions. The quality control conditions are: minor allele frequency (MAF)>0.05; compliance with Hardy-Weinberg equilibrium site; and site deletion rate <20%.

Figure 2:
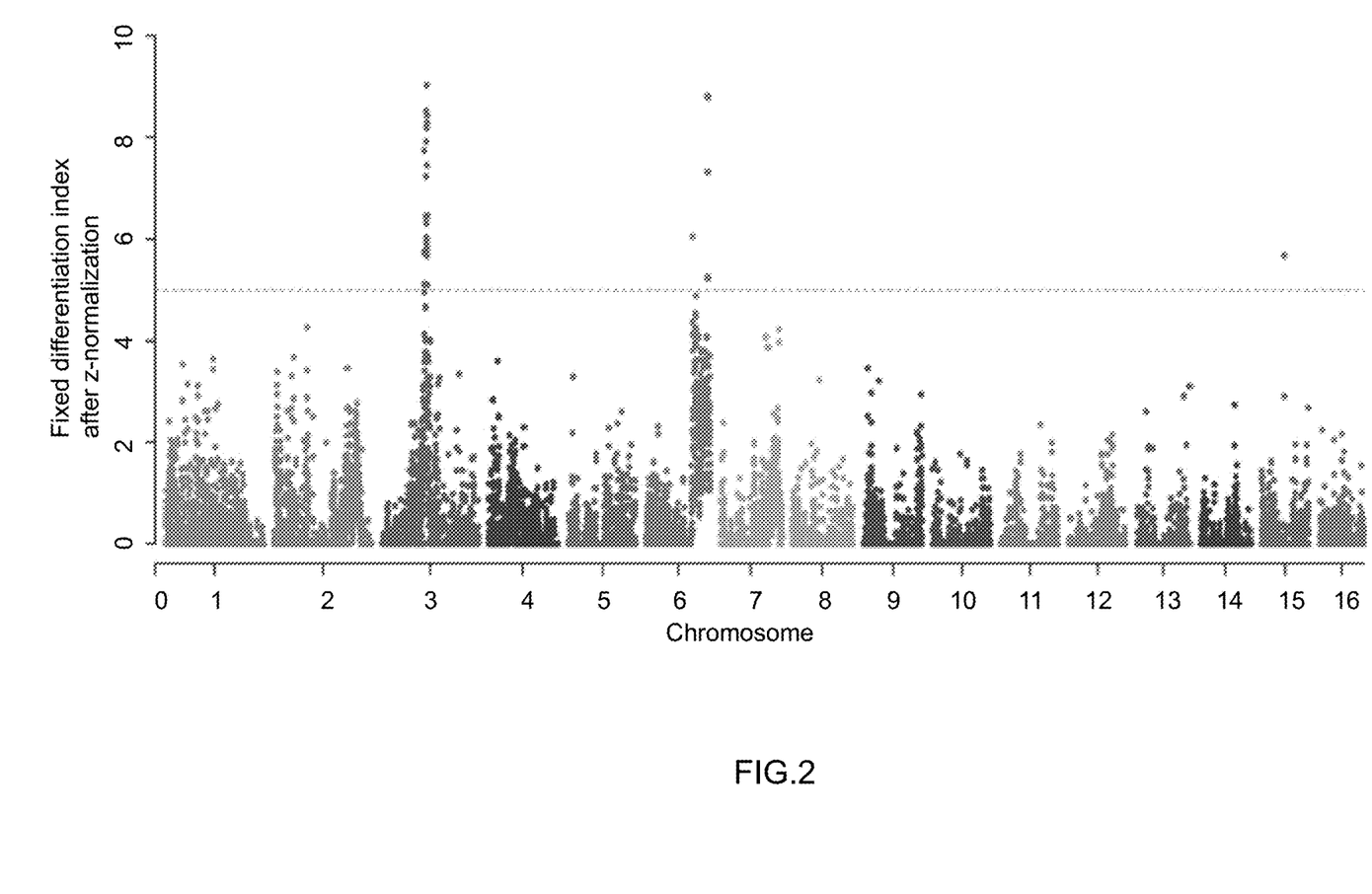
FIG. 2 is a plot of a population genetic differentiation analysis for the normal bay scallops with white adductor muscle and the bay scallops with orange adductor muscle according to an embodiment of the present disclosure.

(6) Genetic differentiation coefficients (Fst) between normal bay scallop population and color variant bay scallop population is calculated using the Vcftools software. Using the Z-transformation FST (ZFst)>5 as a threshold, a signal interval with two populations highly differentiated is found on chromosome 3 (as shown in FIG. 2). For SNPs that exceed the threshold in the signal interval, allele frequency and trait difference are compared, and four SNP sites are screened in a coding region of Arg0059510.1 gene and Arg0059530.1 gene that are significantly different between the normal bay scallops with white adductor muscles and the bay scallops with orange adductor muscles (as shown in Table 1). The four SNP sites are SNP1 (T/G), SNP2 (G/T), SNP3 (C/A) and SNP4 (T/C), respectively, and genotypes significantly related to the carotenoid-rich trait are SNP1: GG, SNP2: TT, SNP3: AA, and SNP4: CC, respectively.

TABLE 1

Information of SNP sites highly differentiated in two populations

| SNP marker | Chromosomes | Position (bp) | ZFst | Gene |
| --- | --- | --- | --- | --- |
| SNP1 | Chr03 | 34979279 | 5.32219 | Arg0059510.1 |
| SNP2 | Chr03 | 34979280 | 5.32219 | Arg0059510.1 |
| SNP3 | Chr03 | 34979425 | 6.30338 | Arg0059510.1 |
| SNP4 | Chr03 | 35046482 | 7.98409 | Arg0059530.1 |

For the four SNP sites, as shown in Table 2, corresponding primers are developed, and a reliability of the SNP sites is verified in the bay scallop populations. Primer information is shown in Table 3.

TABLE 2

Information of SNP molecular markers related to carotenoid-rich bay scallops

| Site number | Sequence number | Base position | Sequences of base fragments before and after the SNP site |
|---|---|---|---|
| SNP1 | SEQ ID NO. 1 | 34979279 | TGGGAAATTTAGATTTTGGAACCGGK(K = T/G)GGAGTTAAAGATCCTATTGTATTTAAAGTCTGTAGCTCGAATTCGTAGGCGAACCAAAGGTCATTTATAGCTACTGTTCTGTTGCGATAGTTAAATACATTAACATTCATGTTATCCATATTTCTCATCATACACTTCATCCTTTCTATAGCGCTGAAGGGAGGGCTAGGGCCC |
| SNP2 | SEQ ID NO. 2 | 34979280 | TGGGAAATTTAGATTTTGGAACCGGTK(K = G/T)GAGTTAAAGATCCTATTGTATTTAAAGTCTGTAGCTCGAATTCGTAGGCGAACCAAAGGTCATTTATAGCTACTGTTCTGTTGCGATAGTTAAATACATTAACATTCATGTTATCCATATTTCTCATCATACACTTCATCCTTTCTATAGCGCTGAAGGGAGGGCTAGGGCCC |
| SNP3 | SEQ ID NO. 3 | 34979425 | TGGGAAATTTAGATTTTGGAACCGGTGGAGTTAAAGATCCTATTGTATTTAAAGTCTGTAGCTCGAATTCGTAGGCGAACCAAAGGTCATTTATAGCTACTGTTCTGTTGCGATAGTTAAATACATTAACATTCATGTTATCCATATTTCTCATCATACACTTCATCCTTTM(M = C/A)TATAGCGCTGAAGGGAGGGCTAGGGCCC |
| SNP4 | SEQ ID NO. 4 | 35046482 | ATAGTAATTGAAAGCAAATGGATTCTTCTGTGTTGGTAGATCCAY(Y = T/C)CACGATCCTACCATCTTGTAGTTCAAAAGCATTTATATGATGAGTAACGAAGACG |

TABLE 3

Primer information

| SNP | Primer sequences | Sequence number |
|---|---|---|
| SNP1 SNP2 SNP3 | Upstream primer Fw: 5'-AGGGAGGAAATACAGACCGTTG-3' Downstream primer Rv: 5'-ACGTGAACGTGTCAAGGCAAGA-3' | SEQ ID NO. 5 SEQ ID NO. 6 |
| SNP4 | Upstream primer Fw: 5'-CAATTTATGTTTTGGTTGCTTAATCAGG-3' Downstream primer Rv: 5'-GGTCATGATTTTTTAGGTGAACATACGA-3' | SEQ ID NO. 7 SEQ ID NO. 8 |

Example 2: Identification of SNP Molecular Markers Related to Carotenoid-Rich Bay Scallops 97 bay scallops are selected, including 48 normal bay scallops with white adductor muscles and 49 bay scallops with orange adductor muscles. A genotyping test is performed for the four SNP sites by Sanger sequencing.

The genotyping test includes the following steps.

(1) Extracting genomic DNA from the bay scallops to be tested.

(2) The genomic DNA obtained in Step (1) is used as a template, and nucleotide sequences shown in SEQ ID NOs. 5~8 are used as primers to separately perform PCR amplification on the genomic DNA, and PCR amplification products are obtained.

(3) Sanger sequencing is performed on the PCR amplification products obtained in Step (2) to determine genotypes of the four SNP sites in each bay scallop to be tested.

(4) Calculate genotype frequencies of the four SNP sites in the normal bay scallop population with white adductor muscles and in the bay scallop population with orange adductor muscles.

(5) According to sequencing results and phenotypic traits, the four SNP sites are found to be tightly interlinked, and 100% of the bay scallops are bay scallops with orange adductor muscles when the genotyping result of the SNP1 site is of a GG type, when the genotyping result of the SNP2 site is of a TT type, when the genotyping result of the SNP3 site is of an AA type, or when the genotyping result of the SNP4 site is of a CC type. 100% of the bay scallops are normal bay scallops with white adductor muscles when the genotyping result of the SNP1 site is of a TT type, when the genotyping result of the SNP2 site is of a GG type, when the genotyping result of the SNP3 site is of a CC type, or when the genotyping result of the SNP4 site is of a TT type. This validation result is consistent with the result of data analysis in Example 1, indicating that the identified SNP sites are effective in distinguishing the carotenoid-rich bay scallop individuals and normal bay scallop individuals.

TABLE 4

Proportion of different genotypes of SNP sites in normal bay scallops with white adductor muscles and bay scallops with orange adductor muscles

| | | Phenotypes | |
|---|---|---|---|
| Name | Genotypes | Normal Bay Scallops with White adductor Muscles | Bay Scallops with Orange adductor Muscles |
| SNP1 | TT | 100% | 0% |
| | GG | 0% | 100% |

TABLE 4-continued

Proportion of different genotypes of SNP sites
in normal bay scallops with white adductormuscles
and bay scallops with orange adductor muscles

| Name | Genotypes | Phenotypes | |
|---|---|---|---|
| | | Normal Bay Scallops with White adductor Muscles | Bay Scallops with Orange adductor Muscles |
| SNP2 | GG | 100% | 0% |
| | TT | 0% | 100% |
| SNP3 | CC | 100% | 0% |
| | AA | 0% | 100% |
| SNP4 | TT | 100% | 0% |
| | CC | 0% | 100% |

Example 3: Molecular Identification, Screening, and Selection of the Seeds and Parents of Bay Scallops A method for molecular identification, screening and selection of the seeds and parents of bay scallops using SNP molecular markers associated with carotenoid coloration includes the following steps.

(1) 50~100 bay scallops to be tested are randomly selected, different sampling strategies for sampling are adopted, and the sampling strategies include: in a small-size seedling stage (shell height of the bay scallops is about 0.5 cm), performing whole tissue sampling on the selected bay scallops for the identification of the seeds of the bay scallop population; in a large-size seedling stage (shell height of the bay scallops is 3-5 cm), performing non-destructive sampling (3-5 gill filaments) on the gill filaments for the directed selection of the seeds of the bay scallop population; and in an adult scallop stage, taking 3~5 gill filaments of each bay scallop and performing non-destructive sampling on the gill filaments for the selection of parents with pure sites.

(2) Sample DNA is extracted as a template using phenol-chloroformextraction, and PCR amplification is performed using the nucleotide sequences shown in SEQ ID NOs. 5~6 and 7~8 as primers, respectively, to obtain PCR amplification products. Sanger sequencing is performed on the PCR amplification products to determine genotypes of the four SNP sites in each bay scallop.

(3) When the genotyping result exhibits that a genotype of one of the bay scallops to be tested containing the SNP1 site is of a GG type, a genotype of the bay scallop to be tested containing the SNP2 site is of a TT type, a genotype of the bay scallop to be tested containing the SNP3 site is of an AA type, or a genotype of the bay scallop to be tested containing the SNP4 site is of a CC type, the bay scallop to be tested is a carotenoid-rich bay scallop; in addition, since the above sites are tightly interlinked, a bay scallop containing any group of the above four sites is also a carotenoid-rich bay scallop.

Figure 3:
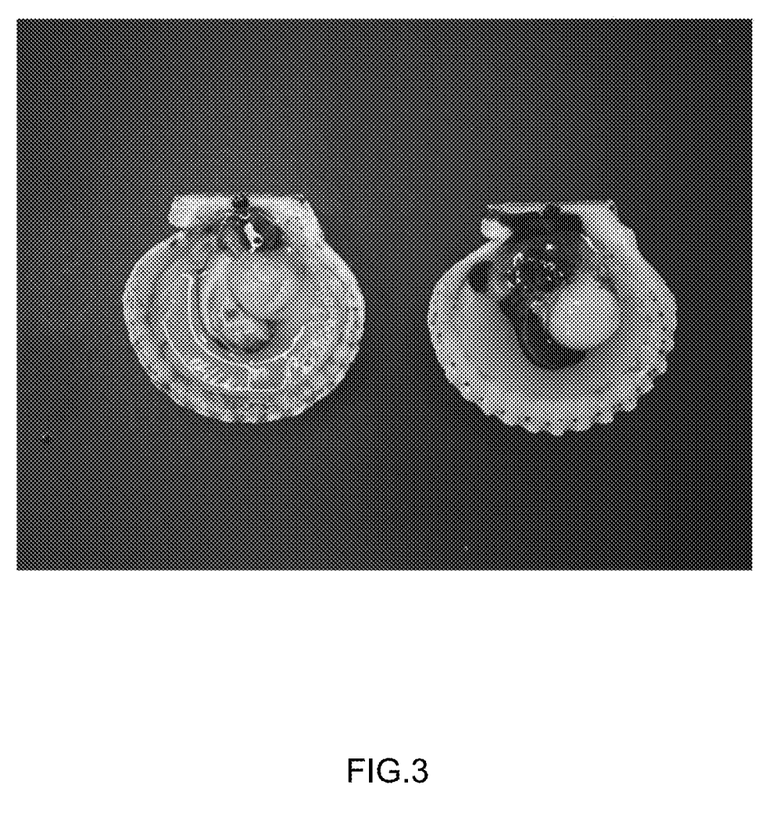
FIG. 3 is a schematic diagram illustrating a result of post-screening cultivation of carotenoid-rich bay scallops according to an embodiment of the present disclosure.

The carotenoid-rich bay scallops may be screened by using the genotypic profiles described above to identify and screen carotenoid-rich bay scallops. FIG. 3 shows the screened carotenoid-rich bay scallops.

The basic concepts have been described above, and it is apparent to those skilled in the art that the foregoing detailed disclosure is intended as an example only and does not constitute a limitation of the present disclosure. While not expressly stated herein, a person skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure.

Also, the present disclosure uses specific words to describe embodiments of the present disclosure, such as "an embodiment", and/or "some embodiments" means a feature, structure, or characteristic associated with at least one embodiment of the present disclosure. Accordingly, it should be emphasized and noted that "one embodiment" referred to two or more times in different locations in the present disclosure or "a number of embodiments" means a feature, structure, or characteristic related to at least one embodiment of the present disclosure. "An embodiment" or "an alternative embodiment" in different places in the present disclosure do not necessarily refer to the same embodiment. In addition, certain features, structures, or characteristics of one or more embodiments of the present disclosure may be suitably combined.

In addition, unless expressly stated in the claims, the order of the processing elements and sequences, the use of numerical letters, or the use of other names as described herein are not intended to qualify the order of the processes and methods of the present disclosure. While some embodiments of the disclosure that are currently considered useful are discussed in the foregoing disclosure by way of various examples, it should be appreciated that such details serve only illustrative purposes, and that additional claims are not limited to the disclosed embodiments, rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the disclosure of the present disclosure, and thereby aid in the understanding of one or more embodiments of the invention, the foregoing descriptions of embodiments of the present disclosure sometimes group multiple features together in a single embodiment, accompanying drawings, or a description thereof description thereof. However, this method of disclosure does not imply that the objects of the present disclosure require more features than those mentioned in the claims. Rather, claimed subject matter may lie in less than all features of a single foregoing disclosed embodiment.

Some embodiments use numbers describing the number of components, attributes, and it should be understood that such numbers used in the description of the embodiments are modified in some examples by the modifiers "about", "approximately", or "substantially", "approximately", or "generally" is used in some examples. Unless otherwise noted, the terms "about, "approximate", or "approximately" indicates that a ±20% variation in the stated number is allowed. Correspondingly, in some embodiments, the numerical parameters used in the present disclosure and claims are approximations, which can change depending on the desired characteristics of individual embodiments. In some embodiments, the numerical parameters should take into account the specified number of valid digits and employ general place-keeping. While the numerical domains and parameters used to confirm the breadth of their ranges in some embodiments of the present disclosure are approximations, in specific embodiments such values are set to be as precise as practicable.

For each patent, patent application, patent application disclosure, and other material cited in the present disclosure, such as articles, books, manuals, publications, documents, etc., the entire contents of which are hereby incorporated herein by reference. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appurtenant to the present disclosure and those set forth herein, the descriptions, definitions and/or use of terms in the present disclosure shall control. use shall prevail.

Finally, it should be understood that the embodiments described in the present disclosure are used only to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for screening carotenoid-rich bay scallops based on molecular markers, wherein the method comprises the following steps:
   (1) sampling bay scallops to be tested;
   (2) extracting sample DNA from the bay scallops to be tested as a template,
   using nucleotide sequences shown in SEQ ID NOs. 5-6 and 7-8 as primers to separately perform PCR amplification on the sample DNA,
   obtaining PCR amplification products, and
   sequencing the PCR amplification products to determine a genotyping type of SNP1, SNP2, SNP3 and SNP4 sites in each bay scallop to be tested;
   (3) when the genotyping result exhibits that a genotype of one of the bay scallops to be tested containing the SNP1 site is of a GG type, a genotype of the bay scallop to be tested containing the SNP2 site is of a TT type, a genotype of the bay scallop to be tested containing the SNP3 site is of an AA type, or a genotype of the bay scallop to be tested containing the SNP4 site is of a CC type, determining the bay scallop to be tested as a carotenoid-rich bay scallop; wherein
   the SNP1 site is located at position 26 of a nucleotide sequence shown in SEQ ID NO. 1, and the base of the SNP1 site is T or G;
   the SNP2 site is located at position 27 of the nucleotide sequence shown in SEQ ID NO. 2, and the base of the SNP2 site is G or T;
   the SNP3 site is located at position 172 of the nucleotide sequence shown in SEQ ID NO. 3, and the base of the SNP3 site is C or A;
   the SNP4 site is located at position 45 of a nucleotide sequence shown in SEQ ID NO. 4, and the base of the SNP4 site is T or C.

2. The method of claim 1, wherein in the step (1), different sampling strategies are adopted at different time periods, and the sampling strategies include:
   in a small-size seedling stage, randomly selecting 50-100 bay scallops from a bay scallop population and performing whole tissue sampling for the identification of the seeds of the bay scallop;
   in a large-size seedling stage, taking 3-5 gill filaments of each bay scallop and performing non-destructive sampling on the gill filaments for the directed selection of the seeds of the bay scallop; and
   in an adult scallop stage, taking 3-5 gill filaments of each bay scallop and performing non-destructive sampling on the gill filaments for the selection of parents of bay scallop.

* * * * *

```
                         SEQUENCE LISTING

Sequence total quantity: 8
SEQ ID NO: 1            moltype = DNA  length = 200
FEATURE                 Location/Qualifiers
source                  1..200
                        mol_type = other DNA
                        organism = synthetic construct
SEQUENCE: 1
tgggaaattt agattttgga accggkggag ttaaagatcc tattgtattt aaagtctgta    60
gctcgaattc gtaggcgaac caaaggtcat ttatagctac tgttctgttg cgatagttaa   120
atacattaac attcatgtta tccatatttc tcatcataca cttcatcctt tctatagcgc   180
tgaagggagg gctagggccc                                               200

SEQ ID NO: 2            moltype = DNA  length = 200
FEATURE                 Location/Qualifiers
source                  1..200
                        mol_type = other DNA
                        organism = synthetic construct
SEQUENCE: 2
tgggaaattt agattttgga accggtkgag ttaaagatcc tattgtattt aaagtctgta    60
gctcgaattc gtaggcgaac caaaggtcat ttatagctac tgttctgttg cgatagttaa   120
atacattaac attcatgtta tccatatttc tcatcataca cttcatcctt tctatagcgc   180
tgaagggagg gctagggccc                                               200

SEQ ID NO: 3            moltype = DNA  length = 200
FEATURE                 Location/Qualifiers
source                  1..200
                        mol_type = other DNA
                        organism = synthetic construct
SEQUENCE: 3
tgggaaattt agattttgga accggtggag ttaaagatcc tattgtattt aaagtctgta    60
gctcgaattc gtaggcgaac caaaggtcat ttatagctac tgttctgttg cgatagttaa   120
atacattaac attcatgtta tccatatttc tcatcataca cttcatcctt tmtatagcgc   180
tgaagggagg gctagggccc                                               200

SEQ ID NO: 4            moltype = DNA  length = 100
FEATURE                 Location/Qualifiers
source                  1..100
                        mol_type = other DNA
                        organism = synthetic construct
SEQUENCE: 4
atagtaattg aaagcaaatg gattcttctg tgttggtaga tccaycacga tcctaccatc    60
ttgtagttca aaagcattta tatgatgagt aacgaagacg                         100

SEQ ID NO: 5            moltype = DNA  length = 22
FEATURE                 Location/Qualifiers
source                  1..22
                        mol_type = other DNA
                        organism = synthetic construct
SEQUENCE: 5
agggaggaaa tacagaccgt tg                                             22

SEQ ID NO: 6            moltype = DNA  length = 22
FEATURE                 Location/Qualifiers
source                  1..22
                        mol_type = other DNA
                        organism = synthetic construct
SEQUENCE: 6
acgtgaacgt gtcaaggcaa ga                                             22
```

```
SEQ ID NO: 7          moltype = DNA   length = 28
FEATURE               Location/Qualifiers
source                1..28
                      mol_type = other DNA
                      organism = synthetic construct
SEQUENCE: 7
caatttatgt tttggttgct taatcagg                                               28

SEQ ID NO: 8          moltype = DNA   length = 28
FEATURE               Location/Qualifiers
source                1..28
                      mol_type = other DNA
                      organism = synthetic construct
SEQUENCE: 8
ggtcatgatt ttttaggtga acatacga                                               28
```